J. E. TAYLOR.
Horse Hay-Rake.
No. 162,713.
Patented April 27, 1875.
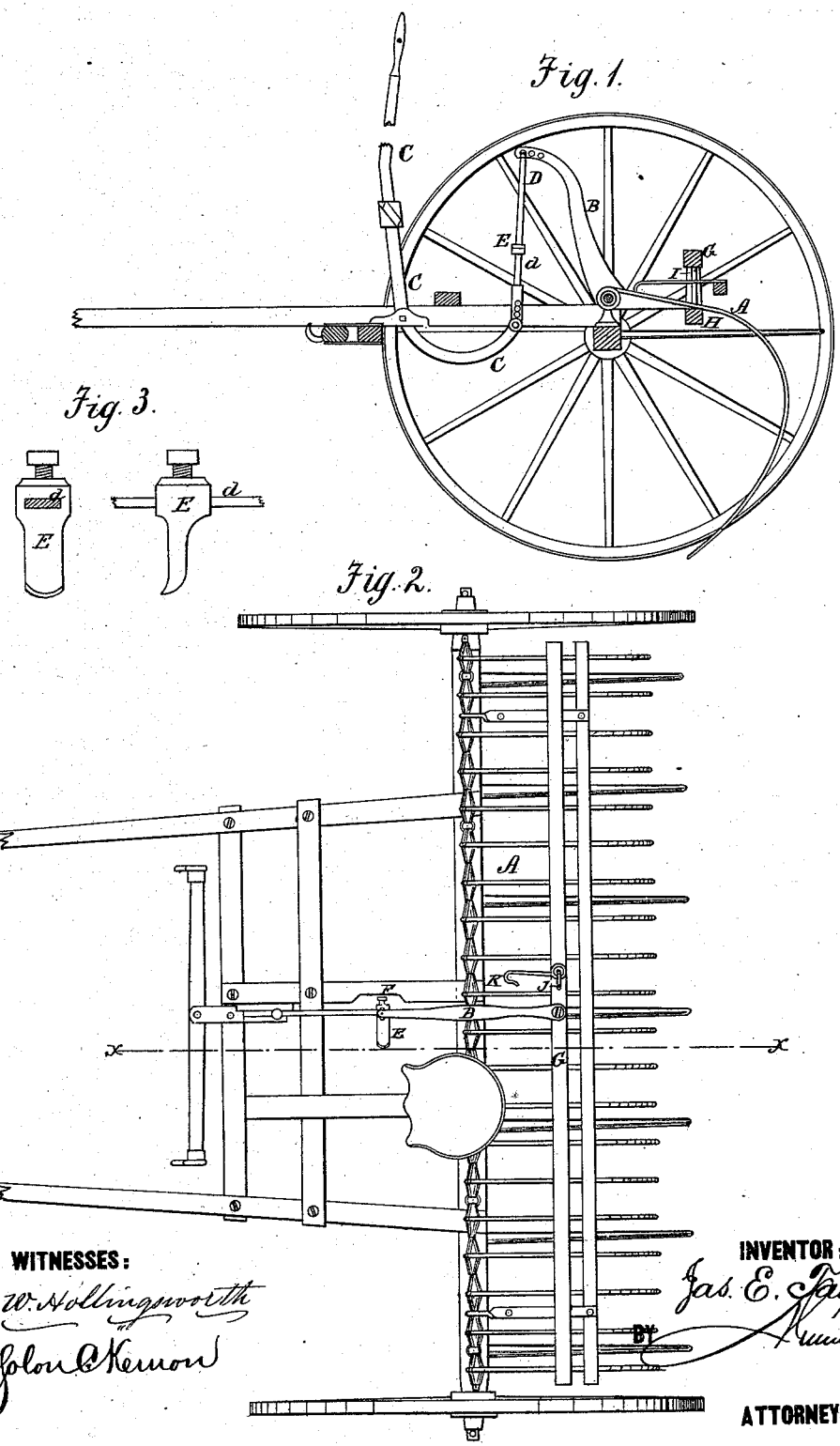

UNITED STATES PATENT OFFICE.

JAMES E. TAYLOR, OF WESTMINSTER, MARYLAND, ASSIGNOR TO TAYLOR MANUFACTURING COMPANY, OF SAME PLACE.

IMPROVEMENT IN HORSE HAY-RAKES.

Specification forming part of Letters Patent No. 162,713, dated April 27, 1875; application filed March 12, 1875.

*To all whom it may concern:*

Be it known that I, JAMES E. TAYLOR, of Westminster, in the county of Carroll and State of Maryland, have invented a new and Improved Horse Hay-Rake; and I do hereby declare that the following is a full, clear, and exact description of the same, reference being had to the accompanying drawing, forming a part of this specification, in which—

Figure 1 is a longitudinal vertical section; Fig. 2, a plan view; Fig. 3, views in detail of foot-piece.

The invention relates to novel means whereby a horse-rake may be conveniently operated with the foot of driver, no matter what may be his size or length of leg.

A represents an oscillating horse-rake having the lift-bar B connected with hand-lever C by a rod, D. I make this rod with an angular portion, $d$, on which is placed the sliding foot-piece E, having angular socket, the latter being held at different elevations, according to the height or length of leg of each driver, by a set-screw, F. G is a cross-bar attached above the teeth to the supporting-bar H, which is below them, by standards I. On the bar G is fixed an eye, J, to which is pivoted a hook, K, that catches over the lever C, and thereby holds up the rake while the horses are taking it to and from the field.

A horse hay-rake thus constructed can be manufactured with great facility, while a driver of any age or height can in a few moments adapt it to himself.

Having thus described my invention, what I claim as new is—

The combination of lift-bar B, hand-lever C, and intermediate connecting-rod D, provided with adjustable foot-piece E, with the oscillating rake A, all constructed and arranged to operate substantially as and for the purpose specified.

JAMES E. TAYLOR.

Witnesses:
  CHAS. A. PETTIT,
  SOLON C. KEMON.